United States Patent
Li et al.

(10) Patent No.: US 9,374,530 B2
(45) Date of Patent: Jun. 21, 2016

(54) METHOD AND APPARATUS FOR DISPLAYING PREVIEW IMAGE AND STORAGE MEDIUM

(71) Applicants: HISENSE MOBILE COMMUNICATIONS TECHNOLOGY CO., LTD., Shandong (CN); Hisense USA Corporation, Suwanee, GA (US)

(72) Inventors: Bing Li, Shandong (CN); Sanfeng Yan, Shandong (CN); Changsheng Zhou, Shandong (CN)

(73) Assignees: Hisense Mobile Communications Technology Co., Ltd (CN); Hisense USA Corporation, Suwanee, GA (US)

( * ) Notice: Subject to any disclaimer, the term of this patent is extended or adjusted under 35 U.S.C. 154(b) by 85 days.

(21) Appl. No.: 14/261,492

(22) Filed: Apr. 25, 2014

(65) Prior Publication Data

US 2015/0215543 A1    Jul. 30, 2015

(30) Foreign Application Priority Data

Jan. 24, 2014   (CN) .......................... 2014 1 0034997

(51) Int. Cl.
*H04N 5/222* (2006.01)
*H04N 5/225* (2006.01)
*H04N 5/232* (2006.01)

(52) U.S. Cl.
CPC ....... *H04N 5/23254* (2013.01); *H04N 5/23229* (2013.01)

(58) Field of Classification Search
None
See application file for complete search history.

(56) References Cited

U.S. PATENT DOCUMENTS

2007/0132874 A1\* 6/2007 Forman et al. ........... 348/333.02
2009/0316999 A1\* 12/2009 Kim et al. .................... 382/209

\* cited by examiner

*Primary Examiner* — Lin Ye
*Assistant Examiner* — Euel Cowan
(74) *Attorney, Agent, or Firm* — DLA Piper LLP (US)

(57) ABSTRACT

There are provided a method and apparatus for displaying a preview image and a storage medium. The method includes: acquiring frames of image data when there is a need to display a preview image; weighting and processing a frame of image data currently acquired and frames of image data acquired recently for a number M of times to obtain the preview image, wherein M is a positive integer; and displaying the preview image.

17 Claims, 3 Drawing Sheets

METHOD AND APPARATUS FOR DISPLAYING PREVIEW IMAGE AND STORAGE MEDIUM

FIELD

The disclosed embodiments relate to the field of image processing and particularly to a method and apparatus for displaying a preview image and a storage medium.

BACKGROUND

There are numerous devices with a photographing function, e.g., a camera, a video recorder, a mobile terminal with a photographing function (e.g., a handset, a notebook computer, a tablet computer, a POS machine, an in-vehicle computer, etc.), etc. These devices with a photographing function generally function as follows: when a photographing mode is enabled by a user, imaging optical sensors in these devices can capture a picture to be taken and display it to the user for preview, that is, when the photographing mode is enabled by the user, the devices with the photographing function can acquire a preview image of the picture to be taken and display the preview image to the user for preview to thereby make it convenient for the user to select an appropriate angle according to the preview image so as to take the picture.

SUMMARY

In some embodiments, a method of displaying a preview image includes:

acquiring frames of image data when there is a need to display a preview image;

weighting and processing a frame of image data currently acquired and frames of image data acquired recently for a number M of times to obtain the preview image, wherein M is a positive integer; and displaying the preview image.

In some embodiments, an apparatus for displaying a preview image includes one or more processors and a storage medium storing computer readable program codes, wherein the computer readable program codes stored in the storage medium are executed by the one or more processors to cause the apparatus to perform a method of displaying a preview image, the method including:

acquiring frames of image data when there is a need to display a preview image;

weighting and processing a frame of image data currently acquired and frames of image data acquired recently for a number M of times to obtain the preview image, wherein M is a positive integer; and displaying the preview image.

In some embodiments, a storage medium stores computer readable program codes, wherein the computer readable program codes are executed by one or more processors to perform a method of display a preview image, the method including:

acquiring frames of image data when there is a need to display a preview image;

weighting and processing a frame of image data currently acquired and frames of image data acquired recently for a number M of times to obtain the preview image, wherein M is a positive integer; and displaying the preview image.

With the foregoing solutions, since the preview image is obtained after the (M+1) frames of image data are weighted and processed, an influence of noise in the preview image upon the preview image can be lowered, and an output effect of the preview image can be improved.

DETAILED DESCRIPTION

In some embodiments of this disclosure, a frame of image data currently acquired and frames of image data acquired recently for a number M of times are weighted and processed to obtain a preview image so that noise in the preview image obtained by weighting and processing the (M+1) frames of image data will have a lower influence upon the preview image. It shall be noted that an executor of the solutions according to the embodiments of this disclosure can be a device with a photographing function, e.g., a camera, a video recorder, a mobile terminal with a photographing function (e.g., a handset, a notebook computer, a tablet computer, a POS machine, an in-vehicle computer, etc.), etc. The embodiments of this disclosure will be further described below with reference to the drawings, but this disclosure will not be limited to the following embodiments.

Figure 1:
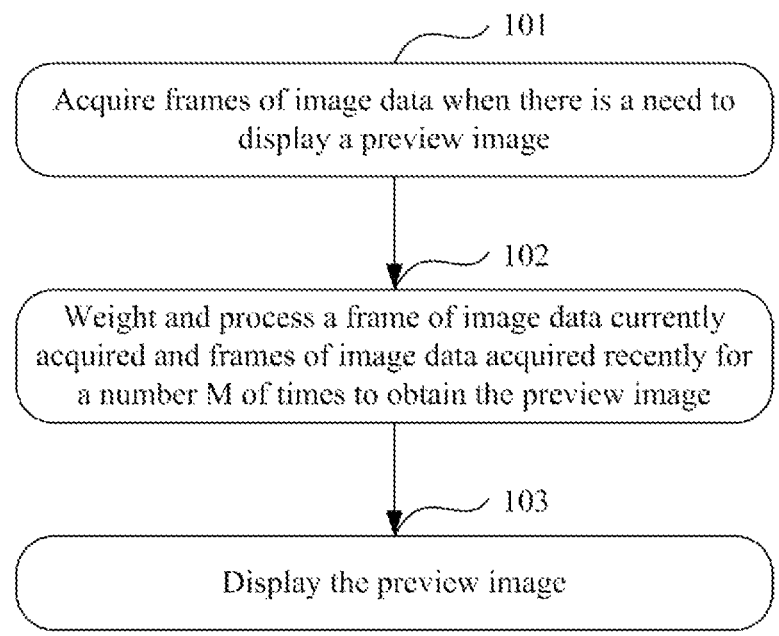
FIG. 1 is a schematic flow chart of a method of displaying a preview image according to an embodiment of this disclosure.

As illustrated in FIG. 1, a method of displaying a preview image according to an embodiment of this disclosure includes the following steps 101 to 103.

The step 101 is to acquire frames of image data when there is a need to display a preview image;

The step 102 is to weight and process a frame of image data currently acquired and frames of image data acquired recently for a number M of times to obtain a preview image; and The step 103 is to display the preview image.

In the step 101, the need to display a preview image refers to enabling of a photographing function, which can be enabling of a photographing function of a device (for example, a photographing function in a smart handset is enabled by a user) or enabling of a supervision device (for example, a supervision camera to supervise a room is enabled). The frames of image data can be acquired in numerous ways, for example, the frames of image data can be acquired by a Complementary Metal Oxide Semiconductor (CMOS) optical sensor or a Charge-Coupled Device (CCD) optical sensor, where the device with the photographing function can acquire the frames of image data in real time or can acquire the frames of image data periodically, that is, acquire the frames of image data at respective fixed instances of time or can acquire otherwise the frames of image data after the photographing function is enabled (that is, there is a need to display preview image).

In the step 102, the frames of image data acquired recently for a number M of times are the latest M frames of image data which are acquired and buffered before the frame of image data currently acquired is acquired.

Optionally, before the frame of image data currently acquired and the frames of image data acquired recently for a number M of times are weighted and processed (that is, before the step 102), whether the frame of image data currently acquired has been offset from a frame of image data lastly acquired (i.e., a previous frame of image data) can be judged according to pixel values of pixels of the frame of image data currently acquired and the frame of image data lastly acquired, and the step 102 will be performed after it is judged that the frame of image data currently acquired has not been offset from the frame of image data lastly acquired. After it is judged that the frame of image data currently acquired has been offset from the frame of image data lastly acquired, the frame of image data currently acquired is determined as the preview image, and the frames of image data previously buffered are deleted.

If a taken picture has been shaken or there has been a moving object in the taken picture, then there may be a difference between the frame of image data currently acquired and the frame of image data lastly acquired, and whether there is a difference between the frame of image data currently acquired and the frame of image data lastly acquired can be judged by judging whether the frame of image data currently acquired has been offset from the frame of image data lastly acquired. The step 102 will be performed after it is judged that the frame of image data currently acquired has not been offset from the frame of image data lastly acquired to thereby alleviate smearing in the preview image generated after the step 102 is performed and improve an output effect of the preview image.

Whether the frame of image data currently acquired has been offset from the frame of image data lastly acquired can be judged in one of the following two implementations or a combination thereof.

First Implementation:

For each pixel in the frame of image data currently acquired, the absolute value of the difference between a pixel value of a pixel, in the frame of image data lastly acquired, at the same location of that pixel and a pixel value of that pixel is determined; the average of the absolute values of the differences corresponding to the respective pixels in the frame of image data currently acquired is determined according to the absolute values of the differences; and if the average is larger than a first preset threshold, then it is judged that the frame of image data currently acquired has been offset from the frame of image data lastly acquired; otherwise, it is judged that the frame of image data currently acquired has not been offset from the frame of image data lastly acquired.

For example, if there are a number n of pixels included in both the frame of image data currently acquired and the frame of image data lastly acquired, a pixel value of the i-th pixel in the frame of image data currently acquired is Fnew(i), and a pixel value of the i-th pixel in the frame of image data lastly acquired is Fprev1(i), then for the i-th pixel in the frame of image data currently acquired, the absolute value Fd(i) of the difference between a pixel value of a pixel, in the frame of image data lastly acquired, at the same location as that pixel and a pixel value of that pixel can be represented as:

$$Fd(i) = |Fnew(i) - Fprev1(i)| \quad [1]$$

Then the average Diff1 can be represented as:

$$Diff1 = \frac{1}{n}\sum_{i=1}^{n} Fd(i) \quad [2]$$
$$= \frac{1}{n}\sum_{i=1}^{n} |Fnew(i) - Fprev1(i)|$$

For a frame of image data, a pixel at the top left corner in the frame of image data can be determined as a first pixel, and pixels can be selected sequentially from the left to the right and then from the top to the bottom, or pixels can be selected sequentially from the top to the bottom and then from the left to the right.

Figure 2:
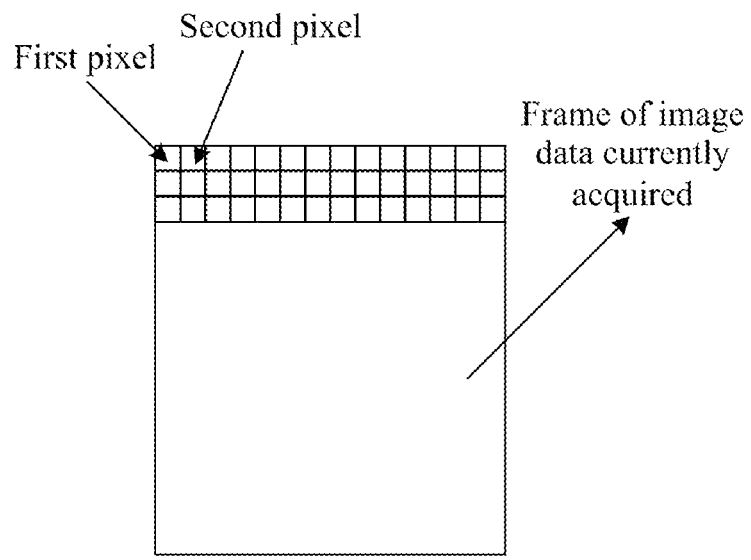
FIG. 2 is a schematic diagram of a first pixel and a second pixel in a frame of image data currently acquired according to an embodiment of this disclosure.

As illustrated in FIG. 2 which is a schematic diagram of a first pixel and a second pixel in the frame of image data currently acquired, pixels in the frame of image data lastly acquired can be selected in the same way as the frame of image data currently acquired to thereby ensure comparison between pixel values of pixels at the same location in the frame of image data currently acquired and the frame of image data lastly acquired and determination of the absolute value of the difference between them.

A pixel value of a pixel in a frame of data image can be a R (red) component or a G (green) component or a B (blue) component in the frame of data frame in the RAW (unprocessed) format or can be a Y (brightness) component or a U (chroma) component or a V (chroma) component in the frame of image data in the YUV format or can be a R component or a G component or a B component in the frame of data frame in the RGB format, and the components in the respective formats range in value from 0 to 255.

The value of the first preset threshold Threshold1 can be set empirically and typically ranges from 1 to 20. If the average Diff1 determined as above is larger than the first preset threshold Threshold1, then it indicates that there is a big difference between the frame of image data currently acquired and the frame of image data lastly acquired.

Second Implementation:

For each pixel in the frame of image data currently acquired, the absolute value of the difference between a pixel value of a pixel, in the frame of image data lastly acquired, at the same location of that pixel and a pixel value of that pixel is determined; the number of the absolute values, larger than a preset pixel threshold, of the differences, corresponding to the respective pixels in the frame of image data currently acquired is determined according to the absolute values of the differences; and if the determined number is larger than a second preset threshold, then it is judged that the frame of image data currently acquired has been offset from the frame of image data lastly acquired; otherwise, it is judged that the frame of image data currently acquired has not been offset from the frame of image data lastly acquired.

The absolute value of the difference can be determined in the same way as the first implementation. For the i-th pixel in the frame of image data currently acquired, if the absolute value Fd(i) of the difference between a pixel value of the pixel and a pixel value of the i-th pixel in the frame of image data lastly acquired is larger than the pixel threshold MinChg, then a count Diff2 of the number is incremented by 1.

The value of the pixel threshold MinChg can be set empirically and typically ranges from 60 to 255. The value of the second preset threshold Threshold2 can be set empirically and typically is less than n. If the number Diff2 determined as above is larger than the second preset threshold Threshold2, then it indicates that there is a big difference between the frame of image data currently acquired and the frame of image data lastly acquired.

If whether the frame of image data currently acquired has been offset from the frame of image data lastly acquired is judged in a combination of the first implementation and the second implementation, then the following two implementations can be involved, i.e., a third implementation and a fourth implementation.

In the third implementation, if the determined average is larger than the first preset threshold or the determined number is larger than the second preset threshold, it is judged that the frame of image data currently acquired has been offset from the frame of image data lastly acquired; otherwise, it is judged that the frame of image data currently acquired has not been offset from the frame of image data lastly acquired.

In the fourth implementation, if the determined average is larger than the first preset threshold and the determined number is larger than the second preset threshold, it is judged that the frame of image data currently acquired has been offset from the frame of image data lastly acquired; otherwise, it is judged that the frame of image data currently acquired has not been offset from the frame of image data lastly acquired.

Optionally, the frame of image data currently acquired is buffered into a queue before it is judged whether the frame of image data currently acquired has been offset from the frame of image data lastly acquired, where the latest D frames of image data are buffered in the queue, D is a positive integer no less than M+1, and M is a positive integer. In an implementation, the values of D and M can be set dependent upon the size of a memory of a terminal.

Before the frame of image data currently acquired is buffered into the queue, if there are D frames of image data already buffered in the queue, then the frame of image data the earliest to store in the queue is deleted, and the frame of image data currently acquired is buffered into the queue; if the number of frames of image data already buffered in the queue is less than D, then the frame of image data currently acquired is buffered directly into the queue, that is, the frames of image data buffered in the queue are ensured to be the latest frames of image data while the number of buffered frames of image data is less than D.

It can be judged whether the frame of image data currently acquired is the only frame of image data in the queue after the frame of image data currently acquired is buffered into the queue, and if so, then the frame of image data currently acquired is determined as the preview image; otherwise, it is judged whether the frame of image data currently acquired has been offset from the frame of image data lastly acquired.

Stated otherwise, if the number of frames of image data buffered in the queue is 0 (that is, there is no frame of image data buffered in the queue) before the frame of image data currently acquired is buffered into the queue, then the frame of image data currently acquired is determined as the preview image. If the number of frames of image data buffered in the queue is not 0 (that is, there is a frame(s) of image data already buffered in the queue) before the frame of image data currently acquired is buffered into the queue, then it is judged whether the frame of image data currently acquired has been offset from the frame of image data lastly acquired, wherein the frame of image data lastly acquired is the latest frame of image data buffered in the queue before the frame of image data currently acquired is buffered into the queue.

Optionally, in order to ensure a small difference between two acquired temporally adjacent frames of image data buffered in the queue, the queue is cleared and the frame of image data currently acquired is determined as the preview image after it is judged that the frame of image data currently acquired has been offset from the frame of image data lastly acquired.

The frame of image data currently acquired and the frames of image data acquired recently for a number M of times are weighted and processed after it is judged the frame of image data currently acquired has not been offset from the frame of image data lastly acquired. If the number of frames of image data buffered in the queue is no less than M+1, then the latest (M+1) frames of image data in the queue are weighted and processed; and if the number of frames of image data buffered in the queue is less than M+1, then all the frames of image data in the queue are weighted and processed, where the frames of image data acquired recently for a number M of times are the latest M frames of image data buffered in the queue before the frame of image data currently acquired is buffered into the queue.

The step 102 can be performed as follows.

Weights corresponding to the frame of image data currently acquired and the frames of image data acquired recently for a number M of times are determined respectively according to a correspondence relationship between acquisition instances of time and weights; each frame of image data is weighted and processed respectively by the weight corresponding to the each frame of image data; and the preview image is determined according to the weighted and processed frames of image data.

For example, if a pixel value of the i-th pixel in the frame of image data currently acquired is Fnew(i), the instance of time when the frame of image data currently acquired is acquired is the latest, and a weight corresponding thereto is $K_0$, and pixel values of the i-th pixels in the frames of image data acquired recently for a number M of times are Fprev1(i) to FprevM(i), the instances of time when the frames of image data acquired recently for a number M of times are acquired decrement sequentially, and weights corresponding the frames of image data acquired recently for a number M of times is $K_1$ to $K_M$, then a pixel value of the i-th pixel in the determined preview image can be represented as:

$$Fout(i) = K_0 * Fnew(i) + \sum_{j=1}^{M} K_j * Fprevj(i) \quad [3]$$

For each pixel in the frame of image data currently acquired and the frames of image data acquired recently for a number M of times, a pixel value of each pixel in the preview image can be determined respectively in Formula of [3].

If the frame of image data currently acquired is Fnew, and the frames of image data recently acquired for a number M of times are Fprev1 to FprevM respectively, the determined preview image Fout can be determined as:

$$Fout = K0 * Fnew + \sum_{j=1}^{M} Kj * Fprevj \quad [4]$$

Since the preview image is obtained after the (M+1) frames of image data are weighted and processed, an influence of noise in the preview image upon the preview image can be lowered as compared with an influence of noise in an originally acquired frame of image data upon the frame of image data because as per the principle of the statistics, if an image I is a combination of a useful signal S and noise N, where S is a continuous signal and N is a random signal, and f is an influence of N upon I, then Formula of [5] will apply:

$$I = S + f*N \quad [5]$$

Then M images are superimposed and averaged, and Formula of [6] will apply:

$$\frac{1}{M}\sum_{m=1}^{M} I = \frac{1}{M}\left(\sum_{m=1}^{M} S + f * \sum_{m=1}^{M} N\right) \quad [6]$$

Formula of [6] can be rearranged into Formula of [7]:

$$I = S + \frac{f}{M} * N \quad [7]$$

An analysis of Formulas [5] and [7] can show that given stable S and N, an influence of N upon I in the image as a result of superimposing and averaging the M images can be lowered from original f to f/M.

Thus in the preview image obtained in the solution according to the embodiments of this disclosure, an influence of noise in the preview image upon the preview image can be lowered and an output effect of the preview image can be improved.

Preferably, in a photographing scenario which is a motion scenario, in order to alleviate smearing possibly occurring in the preview image, a weight in the solution according to an embodiment of this disclosure can decrement with a decrementing instance of time when a frame of image data in the queue is acquired, that is, the earlier the instance of time, when the frame of image data is acquired, is (that is, the lower the value of the acquisition instance of time is), the lower the weight corresponding thereto will be, that is, the frame of image data currently acquired has the highest influence upon the preview image, and the frame of image data acquired at the earliest instance of time among the frames of image data acquired recently for a number M of times has the lowest influence upon the preview image, where the sum of all the weights is 1, that is, the weights are set while satisfying the following two conditions:

Condition 1: $K_j < K_{j-1}$ and $j = 1 \sim M$;

and

Condition 2: $1 = \sum_{j=1}^{M} K_j$.

The obtained preview image can be output for display after the preview image is obtained in the method described above. The preview image can be displayed onto a preview screen of the terminal (e.g., a smart handset).

Figure 3:
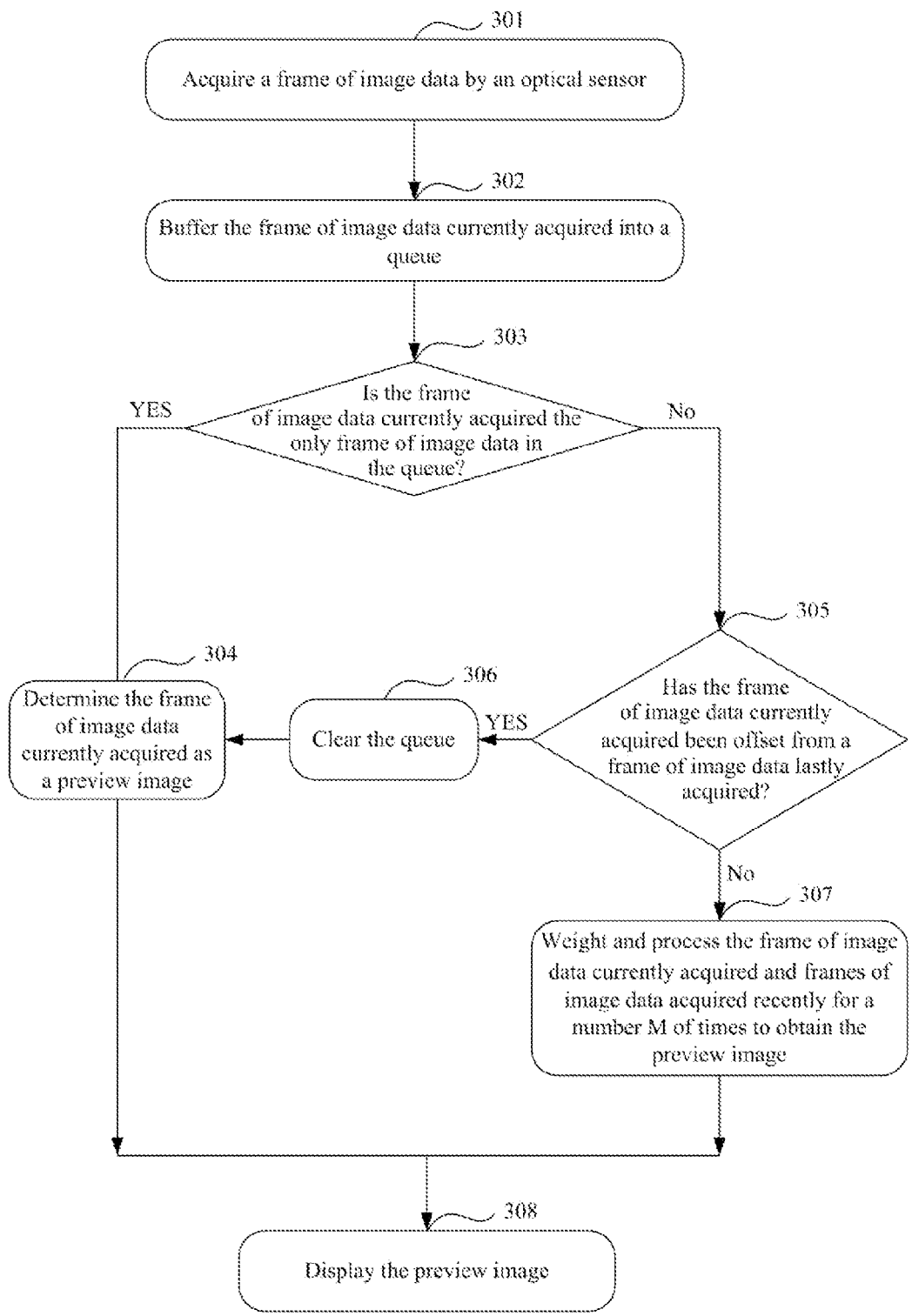
FIG. 3 is a flow chart of an application of a method of displaying a preview image according to an embodiment of this disclosure.

As illustrated in FIG. 3, a flow of an application of the method of display a preview image in an embodiment of this disclosure includes the followings steps 301 to 307.

The step 301 is to acquire a frame of image data when there is a need to display a preview image.

The step 302 is to buffer the frame of image data currently acquired into a queue.

The length of the queue is D, that is, the number of frames of image data buffered in the queue is no more than D, where D is a positive integer no less than M+1. Before the frame of image data currently acquired is buffered into the queue, if there are D frames of image data already buffered in the queue, then the frame of image data the earliest to store in the queue is deleted, and the frame of image data currently acquired is buffered into the queue, so as to ensure the frames of image data buffered in the queue to be the latest frames of image data.

In an implementation, a counter RecvNum can be arranged to count the number of frames of image data buffered in the queue, where the value of the counter is incremented by 1 when a frame of image data is buffered into the queue, and the value of the counter is decremented by 1 when a frame of image data is deleted from the queue. The value of the counter is initialized to 0.

The step 303 is to judge whether the frame of image data currently acquired is the only frame of image data in the queue, and if so, then the flow proceeds to the step 304; otherwise, the flow proceeds to the step 305.

It can be judged whether the value of the counter is no larger than 1, and if so, then the flow proceeds to the step 304; otherwise, the flow proceeds to the step 305.

The step 304 is to determine the frame of image data currently acquired as a preview image, and the flow proceeds to the step 308.

The step 305 is to judge whether the frame of image data currently acquired has been offset from a frame of image data lastly acquired, and if so, then the flow proceeds to the step 306; otherwise, the flow proceeds to the step 307.

The step 306 is to clear the queue, and the flow proceeds to the step 304.

The value of the counter together with the queue is cleared. The number of frames of image data buffered in the queue is 0 after the queue is cleared.

The step 307 is to weight and process the frame of image data currently acquired and frames of image data acquired recently for a number M of times to obtain the preview image.

In an implementation, if the number of frames of image data buffered in the queue is no less than M+1, then the latest (M+1) frames of image data in the queue are weighted and processed; and if the number of frames of image data buffered in the queue is less than M+1, then all the frames of image data in the queue are weighted and processed, where the frames of image data acquired recently for a number M of times are the latest M frames of image data buffered in the queue before the frame of image data currently acquired is buffered into the queue.

In view of the possibility that the number of frames of image data buffered in the queue is less than M+1, M sets of weights can be set in an implementation. For example, if the value of M is preset to 3, then 3 sets of weights can be set, where a first set of weights includes two weights, a second set of weights includes three weights, and a third set of weights includes four weights. If the number of frames of image data buffered in the queue is 2, then the first set of weights including two weights can be selected among the 3 sets of weights, where the earlier the instance of time, when a frame of image data is acquired, is (that is, the lower the value of the acquisition instance of time is), the lower a weight corresponding thereto will be.

The step 308 is to display the preview image.

Figure 4:
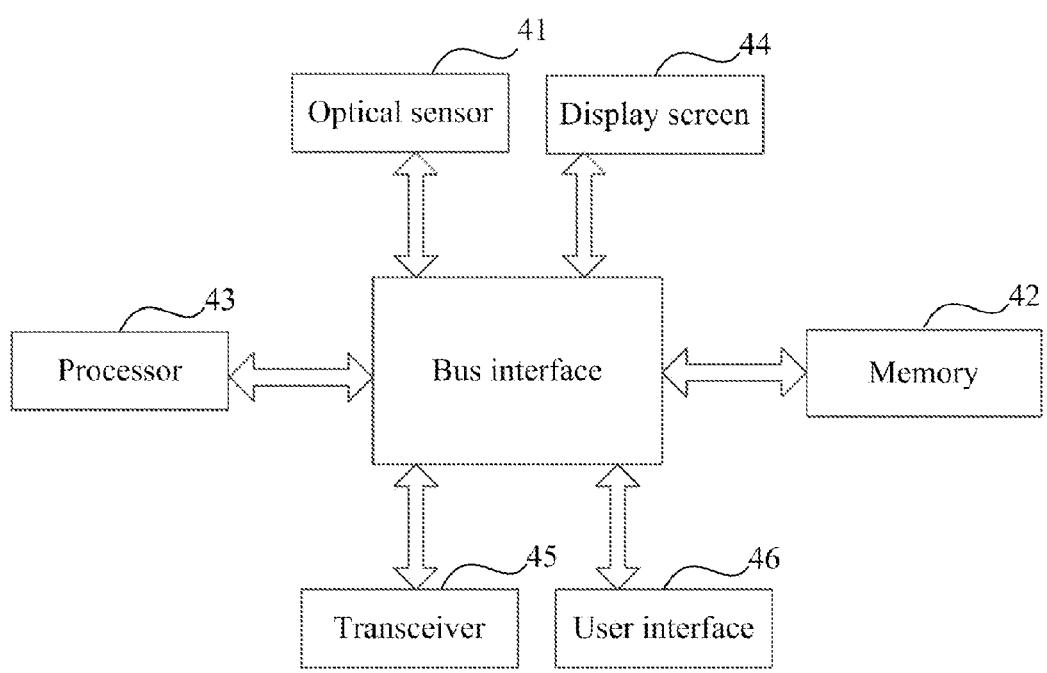
FIG. 4 is a schematic structural diagram of an apparatus for displaying a preview image according to an embodiment of this disclosure.

Another embodiment of this disclosure provides an apparatus for displaying a preview image, where the apparatus includes one or more processors and a storage medium storing computer readable program codes, and the computer readable program codes stored in the storage medium are executed by the one or more processors to cause the apparatus to perform a method of displaying a preview image similar to the method of displaying a preview image in the embodiment described above (see FIG. 1 to FIG. 3). By way of an example, as illustrated in FIG. 4, the apparatus for displaying a preview image generally includes an optical sensor 41, a memory 42, a processor 43 and a display screen 44, where the optical sensor 41 is configured to acquire frames of image data;

The memory 42 is configured to store the frames of image data acquired by the optical sensor 41;

The processor 42 is configured to read the frames of image data from the memory 42 and to weight and process a frame of image data currently acquired and frames of image data acquired recently for a number M of times to obtain a preview image, where M is a positive integer; and The display 44 is configured to display the preview image obtained by the processor 43.

Moreover the apparatus with a photographing function may or may not further include a transceiver 45 and/or a user interface 46.

In FIG. 4, a bus architecture can include any number of interconnection buses and bridges which are configured to link various circuits together including one or more processors represented by the processor 43 and a memory represented by the memory 42. The bus architecture can link various other circuits together, e.g., peripheral devices, a manostat, a power management circuit, etc., all of which are well known in the art, so a repeated description thereof will be omitted here. A bus interface provides an interface. The transceiver 45 can include a plurality of elements including a transmitter and a receiver configured to provide elements communicating with other various apparatuses over a transmission medium. For a different user equipment, the user interface 46 can also be an interface capable of connecting a device externally or internally, where the connected device can include but will not be limited to a keypad, a display, a speaker, a microphone, a joy stick, etc.

The processor 43 is configured to determine weights corresponding to the frame of image data currently acquired and the frames of image data acquired recently for a number M of times respectively according to a correspondence relationship between acquisition instances of time and weights; to weight and process each frame of image data respectively by the weight corresponding to the each frame of image data; and to determine the preview image according to the weighted and processed frames of image data.

Optionally, the processor 43 is further configured, before the frame of image data currently acquired and the frames of image data acquired recently for a number M of times are weighted and processed, to judge whether the frame of image data currently acquired has been offset from a frame of image data lastly acquired according to pixel values of pixels of the frame of image data currently acquired and the frame of image data lastly acquired; and to weight and process the frame of image data currently acquired and the frames of image data acquired recently for a number M of times after it is judged that the frame of image data currently acquired has not been offset from the frame of image data lastly acquired.

Optionally, the processor 43 is further configured, before it is judged whether the frame of image data currently acquired has been offset from a frame of image data lastly acquired according to pixel values of pixels of the frame of image data currently acquired and the frame of image data lastly acquired, to buffer the frame of image data currently acquired into a queue, where the latest D frames of image data are buffered in the queue, and D is a positive integer no less than M+1.

Optionally, the processor 43 is further configured to judge whether the frame of image data currently acquired is the only frame of image data in the queue after the frame of image data currently acquired is buffered into the queue, and if so, to determine the frame of image data currently acquired as the preview image; otherwise, to determine whether the frame of image data currently acquired has been offset from the frame of image data lastly acquired.

Optionally, the processor 43 is further configured to clear the queue and determine the frame of image data currently acquired as the preview image after it is judged that the frame of image data currently acquired has been offset from the frame of image data lastly acquired The processor 43 is further configured to weight and process the latest (M+1) frames of image data in the queue if the number of frames of image data buffered in the queue is no less than M+1.

Optionally, the processor 43 is further configured to weight and process all the frames of image data in the queue if the number of frames of image data buffered in the queue is less than M+1.

The processor 43 is further configured, for each pixel in the frame of image data currently acquired, to determine the absolute value of the difference between a pixel value of a pixel, in the frame of image data lastly acquired, at the same location of that pixel and a pixel value of that pixel; to determine the average of the absolute values of the differences corresponding to the respective pixels in the frame of image data currently acquired according to the absolute values of the differences; and if the average is larger than a first preset threshold, to judge that the frame of image data currently acquired has been offset from the frame of image data lastly acquired; otherwise, to judge that the frame of image data currently acquired has not been offset from the frame of image data lastly acquired; or to determine the number of the absolute values, larger than a preset pixel threshold, of the differences, corresponding to the respective pixels in the frame of image data currently acquired according to the absolute values of the differences; and if the number is larger than a second preset threshold, to judge that the frame of image data currently acquired has been offset from the frame of image data lastly acquired; otherwise, to judge that the frame of image data currently acquired has not been offset from the frame of image data lastly acquired; or to determine the average of the absolute values of the differences corresponding to the respective pixels in the frame of image data currently acquired and the number of the absolute values, larger than a preset pixel threshold, of the differences according to the absolute values of the differences; and if the average is larger than a first preset threshold and/or the number is larger than a second preset threshold, to judge that the frame of image data currently acquired has been offset from the frame of image data lastly acquired; otherwise, to judge that the frame of image data currently acquired has not been offset from the frame of image data lastly acquired.

In another aspect, a further embodiment of this disclosure provides a computer readable storage medium which can be a computer readable storage medium included in the memory in the foregoing embodiment or can be a computer readable storage medium which separately exists instead of being installed into the apparatus. One or more programs are stored in the computer readable storage medium and executed by one or more processors to perform a method of display a preview image; and reference can be made for the relevant description of the embodiments illustrated in FIG. 1 to FIG. 3 for the steps of the method, so repeated description thereof will be omitted here.

Those skilled in the art shall appreciate that the embodiments of this disclosure can be embodied as a method, a system or a computer program product. Therefore this disclosure can be embodied in the form of an all-hardware embodiment, an all-software embodiment or an embodiment of software and hardware in combination. Furthermore this disclosure can be embodied in the form of a computer program product embodied in one or more computer useable storage mediums (including but not limited to a disk memory, a CD-ROM, an optical memory, etc.) in which computer useable program codes are contained.

This disclosure has been described in a flow chart and/or a block diagram of the method, the device (system) and the computer program product according to the embodiments of this disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of this disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of this disclosure.

Evidently those skilled in the art can make various modifications and variations to this disclosure without departing from the essence and scope of this disclosure. Thus this disclosure is also intended to encompass these modifications and variations thereto so long as the modifications and variations come into the scope of the claims appended to this disclosure and their equivalents.

The invention claimed is:

1. A method of displaying a preview image comprising: acquiring frames of image data by an optical sensor when there is a need to display a preview image; weighting and processing by a processor, a frame of image data currently acquired and frames of image data acquired recently for a number M of times to obtain the preview image, wherein M is a positive integer; and wherein the weighting and processing by the processor, of the frame of image data currently acquired and the frames of image data acquired recently for a number M of times to obtain the preview image comprises:

determining via the processor, weights corresponding to the frame of image data currently acquired and the frames of image data acquired recently for a number M of times respectively according to a correspondence relationship between acquisition instances of time and weights;

weighting and processing each frame of image data by a weight corresponding to the frame of image data; and determining the preview image according to weighted and processed frames of image data; and displaying the determined preview image on a display screen.

2. The method of claim 1, further comprising before weighting and processing the frame of image data currently acquired and the frames of image data acquired recently for a number M of times:

judging whether the frame of image data currently acquired has been offset from a frame of image data lastly acquired according to pixel values of pixels of the frame of image data currently acquired and the frame of image data lastly acquired; and wherein the weighting and processing the frame of image data currently acquired and the frames of image data acquired recently for a number M of times comprises:

weighting and processing the frame of image data currently acquired and the frames of image data acquired recently for a number M of times after it is judged that the frame of image data currently acquired has not been offset from the frame of image data lastly acquired.

3. The method of claim 2, further comprising before judging whether the frame of image data currently acquired has been offset from the frame of image data lastly acquired:

buffering the frame of image data currently acquired into a queue, wherein the latest D frames of image data are buffered in the queue, and D is a positive integer no less than M+1; and judging whether the frame of image data currently acquired is the only frame of image data in the queue, and if so, then determining the frame of image data currently acquired as the preview image; otherwise, determining whether the frame of image data currently acquired has been offset from the frame of image data lastly acquired.

4. The method of claim 3, further comprising after judging that the frame of image data currently acquired has been offset from the frame of image data lastly acquired:

clearing the queue and determining the frame of image data currently acquired as the preview image.

5. The method of claim 3, wherein the weighting and processing the frame of image data currently acquired and the frames of image data acquired recently for a number M of times comprises:

weighting and processing the latest M+1 frames of image data in the queue when the number of frames of image data buffered in the queue is no less than M+1; or weighting and processing all frames of image data in the queue when the number of frames of image data buffered in the queue is less than M+1.

6. The method of claim 2, wherein the judging whether the frame of image data currently acquired has been offset from the frame of image data lastly acquired according to the pixel values of the pixels of the frame of image data currently acquired and the frame of image data lastly acquired comprises:

for each pixel in the frame of image data currently acquired, determining an absolute value of a difference between a pixel value of a pixel in the frame of image data lastly acquired and a pixel value of that pixel in the frame of image data currently acquired, wherein that pixel in the frame of image data lastly acquired is the same location with that pixel in the frame of image data currently acquired; and determining an average of absolute values of differences corresponding to respective pixels in the frame of image data currently acquired according to the absolute values of the differences; and if the average is larger than a first preset threshold, then judging that the frame of image data currently acquired has been offset from the frame of image data lastly acquired; otherwise, judging that the frame of image data currently acquired has not been offset from the frame of image data lastly acquired; or determining the number of absolute values, larger than a preset pixel threshold, of differences, corresponding to respective pixels in the frame of image data currently acquired according to the absolute values of the differences; and if the number is larger than a second preset threshold, then judging that the frame of image data currently acquired has been offset from the frame of image data lastly acquired; otherwise, judging that the frame of image data currently acquired has not been offset from the frame of image data lastly acquired; or determining an average of absolute values of differences corresponding to respective pixels in the frame of image data currently acquired and the number of absolute values, larger than a preset pixel threshold, of differences according to the absolute values of the differences; and if the average is larger than a first preset threshold and/or the number is larger than a second preset threshold, then judging that the frame of image data currently acquired has been offset from the frame of image data lastly acquired; otherwise, judging that the frame of image data currently acquired has not been offset from the frame of image data lastly acquired.

7. An apparatus for displaying a preview image comprising one or more processors and a non-transitory computer readable memory storing computer readable program codes, wherein the computer readable program codes stored in the storage medium are executed by the one or more processors to:

acquire frames of image data via an optical sensor when there is a need to display a preview image: weigh and process via a processor, a frame of image data currently acquired and frames of image data acquired recently for a number M of times to obtain the preview image, wherein M is a positive integer; and wherein the weighting and processing the frame of image data currently acquired and the frames of image data acquired recently for a number M of times to obtain the preview image comprises:

determining weights corresponding to the frame of image data currently acquired and the frames of image data acquired recently for a number M of times respectively according to a correspondence relationship between acquisition instances of time and weights;

weighting and processing each frame of image data by a weight corresponding to the frame of image data; and determine the preview image according to weighted and processed frames of image data; and display the determined preview image on a display screen.

8. The apparatus of claim 7, wherein before weighting and processing the frame of image data currently acquired and the frames of image data acquired recently for a number M of times, the method further comprises:

judging whether the frame of image data currently acquired has been offset from a frame of image data lastly acquired according to pixel values of pixels of the frame of image data currently acquired and the frame of image data lastly acquired; and wherein the weighting and processing the frame of image data currently acquired and the frames of image data acquired recently for a number M of times comprises:

weighting and processing the frame of image data currently acquired and the frames of image data acquired recently for a number M of times after it is judged that the frame of image data currently acquired has not been offset from the frame of image data lastly acquired.

9. The apparatus of claim 8, wherein before judging whether the frame of image data currently acquired has been offset from the frame of image data lastly acquired, the method further comprises:

buffering the frame of image data currently acquired into a queue, wherein the latest D frames of image data are buffered in the queue, and D is a positive integer no less than M+1; and judging whether the frame of image data currently acquired is the only frame of image data in the queue, and if so, then determining the frame of image data currently acquired as the preview image; otherwise, determining whether the frame of image data currently acquired has been offset from the frame of image data lastly acquired.

10. The apparatus of claim 9, wherein after judging that the frame of image data currently acquired has been offset from the frame of image data lastly acquired, the method further comprises:

clearing the queue and determining the frame of image data currently acquired as the preview image.

11. The apparatus of claim 9, wherein the weighting and processing the frame of image data currently acquired and the frames of image data acquired recently for a number M of times comprises:

weighting and processing the latest M+1 frames of image data in the queue when the number of frames of image data buffered in the queue is no less than M+1; or weighting and processing all frames of image data in the queue when the number of frames of image data buffered in the queue is less than M+1.

12. The apparatus of claim 8, wherein the judging whether the frame of image data currently acquired has been offset from the frame of image data lastly acquired according to the pixel values of the pixels of the frame of image data currently acquired and the frame of image data lastly acquired comprises:

for each pixel in the frame of image data currently acquired, determining an absolute value of a difference between a pixel value of a pixel in the frame of image data lastly acquired at the same location of that pixel and a pixel value of that pixel in the frame of image data currently acquired, wherein that pixel in the frame of image data lastly acquired is the same location with that pixel in the frame of image data currently acquired; and determining an average of absolute values of differences corresponding to respective pixels in the frame of image data currently acquired according to the absolute values of the differences; and if the average is larger than a first preset threshold, then judging that the frame of image data currently acquired has been offset from the frame of image data lastly acquired; otherwise, judging that the frame of image data currently acquired has not been offset from the frame of image data lastly acquired; or determining the number of absolute values, larger than a preset pixel threshold, of differences, corresponding to respective pixels in the frame of image data currently acquired according to the absolute values of the differences; and if the number is larger than a second preset threshold, then judging that the frame of image data currently acquired has been offset from the frame of image data lastly acquired; otherwise, judging that the frame of image data currently acquired has not been offset from the frame of image data lastly acquired; or determining an average of absolute values of differences corresponding to respective pixels in the frame of image data currently acquired and the number of absolute values, larger than a preset pixel threshold, of differences according to the absolute values of the differences; and if the average is larger than a first preset threshold and/or the number is larger than a second preset threshold, then judging that the frame of image data currently acquired has been offset from the frame of image data lastly acquired; otherwise, judging that the frame of image data currently acquired has not been offset from the frame of image data lastly acquired.

13. A non-transitory computer readable memory storing computer readable program codes, wherein the computer readable program codes are executed by one or more processors to perform a method of display a preview image, the method comprising:

acquiring frames of image data by an optical sensor when there is a need to display a preview image; weighting and processing via a processor, a frame of image data currently acquired and frames of image data acquired recently for a number M of times to obtain the preview image, wherein M is a positive integer; and wherein the weighting and processing done by the processor of the frame of image data currently acquired and the frames of image data acquired recently for a number M of times to obtain the preview image comprises:

determining weights corresponding to the frame of image data currently acquired and the frames of image data acquired recently for a number M of times respectively according to a correspondence relationship between acquisition instances of time and weights;

weighting and processing each frame of image data by a weight corresponding to the frame of image data; and determining the preview image according to weighted and processed frames of image data; and displaying the determined preview image on a display screen.

14. The memory of claim 13, wherein before weighting and processing the frame of image data currently acquired and the frames of image data acquired recently for a number M of times, the method further comprises:

judging whether the frame of image data currently acquired has been offset from a frame of image data lastly acquired according to pixel values of pixels of the frame of image data currently acquired and the frame of image data lastly acquired; and wherein the weighting and processing the frame of image data currently acquired and the frames of image data acquired recently for a number M of times comprises:

weighting and processing the frame of image data currently acquired and the frames of image data acquired recently for a number M of times after it is judged that the frame of image data currently acquired has not been offset from the frame of image data lastly acquired.

15. The memory of claim 14, wherein before judging whether the frame of image data currently acquired has been offset from the frame of image data lastly acquired, the method further comprises:

buffering the frame of image data currently acquired into a queue, wherein the latest D frames of image data are buffered in the queue, and D is a positive integer no less than M+1; and judging whether the frame of image data currently acquired is the only frame of image data in the queue, and if so, then determining the frame of image data currently acquired as the preview image; otherwise, determining whether the frame of image data currently acquired has been offset from the frame of image data lastly acquired.

16. The memory of claim 15, wherein the weighting and processing the frame of image data currently acquired and the frames of image data acquired recently for a number M of times comprises:

weighting and processing the latest M+1 frames of image data in the queue when the number of frames of image data buffered in the queue is no less than M+1; or weighting and processing all frames of image data in the queue when the number of frames of image data buffered in the queue is less than M+1.

17. The memory of claim 14, wherein the judging whether the frame of image data currently acquired has been offset from the frame of image data lastly acquired according to the pixel values of the pixels of the frame of image data currently acquired and the frame of image data lastly acquired comprises:

for each pixel in the frame of image data currently acquired, determining an absolute value of a difference between a pixel value of a pixel, in the frame of image data lastly acquired, at the same location of that pixel and a pixel value of that pixel; and determining an average of absolute values of differences corresponding to respective pixels in the frame of image data currently acquired according to the absolute values of the differences; and if the average is larger than a first preset threshold, then judging that the frame of image data currently acquired has been offset from the frame of image data lastly acquired; otherwise, judging that the frame of image data currently acquired has not been offset from the frame of image data lastly acquired; or determining the number of absolute values, larger than a preset pixel threshold, of differences, corresponding to respective pixels in the frame of image data currently acquired according to the absolute values of the differences; and if the number is larger than a second preset threshold, then judging that the frame of image data currently acquired has been offset from the frame of image data lastly acquired; otherwise, judging that the frame of image data currently acquired has not been offset from the frame of image data lastly acquired; or determining an average of absolute values of differences corresponding to respective pixels in the frame of image data currently acquired and the number of absolute values, larger than a preset pixel threshold, of differences according to the absolute values of the differences; and if the average is larger than a first preset threshold and/or the number is larger than a second preset threshold, then judging that the frame of image data currently acquired has been offset from the frame of image data lastly acquired; otherwise, judging that the frame of image data currently acquired has not been offset from the frame of image data lastly acquired.

* * * * *